United States Patent

Watanabe et al.

[11] Patent Number: 5,414,764
[45] Date of Patent: May 9, 1995

[54] COMMUNICATIONS APPARATUS

[75] Inventors: Tsunehiro Watanabe, Tokyo; Hisao Terajima; Teruyuki Nishii, both of Yokohama, all of Japan

[73] Assignee: Canon Kabushiki Kaisha, Tokyo, Japan

[21] Appl. No.: 227,583

[22] Filed: Apr. 14, 1994

Related U.S. Application Data

[63] Continuation of Ser. No. 803,438, Dec. 6, 1991, abandoned.

[30] Foreign Application Priority Data

Dec. 10, 1990 [JP] Japan ................................ 2-401062
Jan. 25, 1991 [JP] Japan ................................ 3-007766

[51] Int. Cl.6 ............................................ H04M 1/65
[52] U.S. Cl. .................................. 379/377; 379/161; 379/184; 379/199
[58] Field of Search ............... 379/161, 184, 199, 200, 379/377, 379, 100, 107

[56] References Cited

U.S. PATENT DOCUMENTS

| | | | |
|---|---|---|---|
| 3,435,151 | 3/1969 | Russell | 379/194 X |
| 4,218,590 | 8/1980 | Rasmussen et al. | 379/161 |
| 4,444,999 | 4/1984 | Sparrevohn | 379/195 |
| 4,567,329 | 1/1986 | Bailly et al. | 379/379 X |
| 4,807,278 | 2/1989 | Ross | 379/184 |
| 4,809,317 | 2/1989 | Howe et al. | 379/184 X |
| 4,825,465 | 4/1989 | Ryan | 379/161 X |
| 4,941,166 | 7/1990 | Waldman et al. | 379/184 X |
| 4,947,423 | 8/1990 | Watanabe | 379/352 |
| 5,216,705 | 6/1993 | Yoshida et al. | 379/100 |
| 5,255,312 | 10/1993 | Koshiishi | 379/100 |

Primary Examiner—James L. Dwyer
Assistant Examiner—M. W. Shehata
Attorney, Agent, or Firm—Fitzpatrick, Cella, Harper & Scinto

[57] ABSTRACT

A communication unit connectable in parallel with other communication equipment to a two-wire telephone line communicates through the telephone line and a detector detects a voltage across the two-wire telephone line. A command unit commands communication by the communication unit and a controller controls the communication by the communication unit according to the detection by the detector and the command by the command unit.

13 Claims, 4 Drawing Sheets

5,414,764

COMMUNICATIONS APPARATUS

This application is a continuation of application Ser. No. 07/803,438, filed Dec. 6, 1991, now abandoned.

BACKGROUND OF THE INVENTION

1. Field of the Invention

The present invention relates to a communication apparatus to be connected to a telephone line.

2. Related Background Art

A prior art communication apparatus such as a facsimile device is configured as shown in FIG. 3.

In FIG. 3, numeral 1' denotes a communication apparatus, numeral 2 denotes a daughter telephone set, numeral 3 denotes a parallel telephone set, numeral 4 denotes a current detection circuit, numeral 5 denotes a communication unit for data modulation and demodulation, and numeral 16 denotes a control unit.

When the telephone set 2 connected to the communication apparatus 1' is off-hooked, a line current flows into the current detection circuit 4 and the control unit 16 detects that the telephone set 2 has captured the telephone line 9.

However, in the prior art apparatus, even if the telephone set 3 which is directly connected to the telephone line is off-hooked, no current flows into the current detection circuit 4 of the communication apparatus 1'. Accordingly, the control unit 16 cannot detect that the telephone line has been captured by the telephone set 3.

Accordingly, if a communication is to be made by the communication apparatus 1' or the telephone set 2 is off-hooked for speech when the telephone set is off-hooked, the telephone line is captured and it interferes the communication by the telephone set 3.

Further, once the telephone set 3 receives a call, the communication apparatus 1' cannot be started up.

SUMMARY OF THE INVENTION

It is an object of the present invention to provide an improved data communication apparatus.

It is another object of the present invention to provide a data communication apparatus which can detect status of equipment parallelly connected to a telephone line.

It is still another object of the present invention to provide a data communication apparatus having a detection circuit for detecting a voltage of the telephone line to detect status of equipment parallelly connected to the telephone line by a change of the voltage of the line.

It is a further object of the present invention to provide a voltage detection circuit which properly detects the voltage of the line.

Other objects of the present invention will be apparent from the following description of the embodiments and the drawings.

DETAILED DESCRIPTION OF THE PREFERRED EMBODIMENTS

One embodiment of the present invention is now explained in detail with reference to the drawings.

Figure 1:
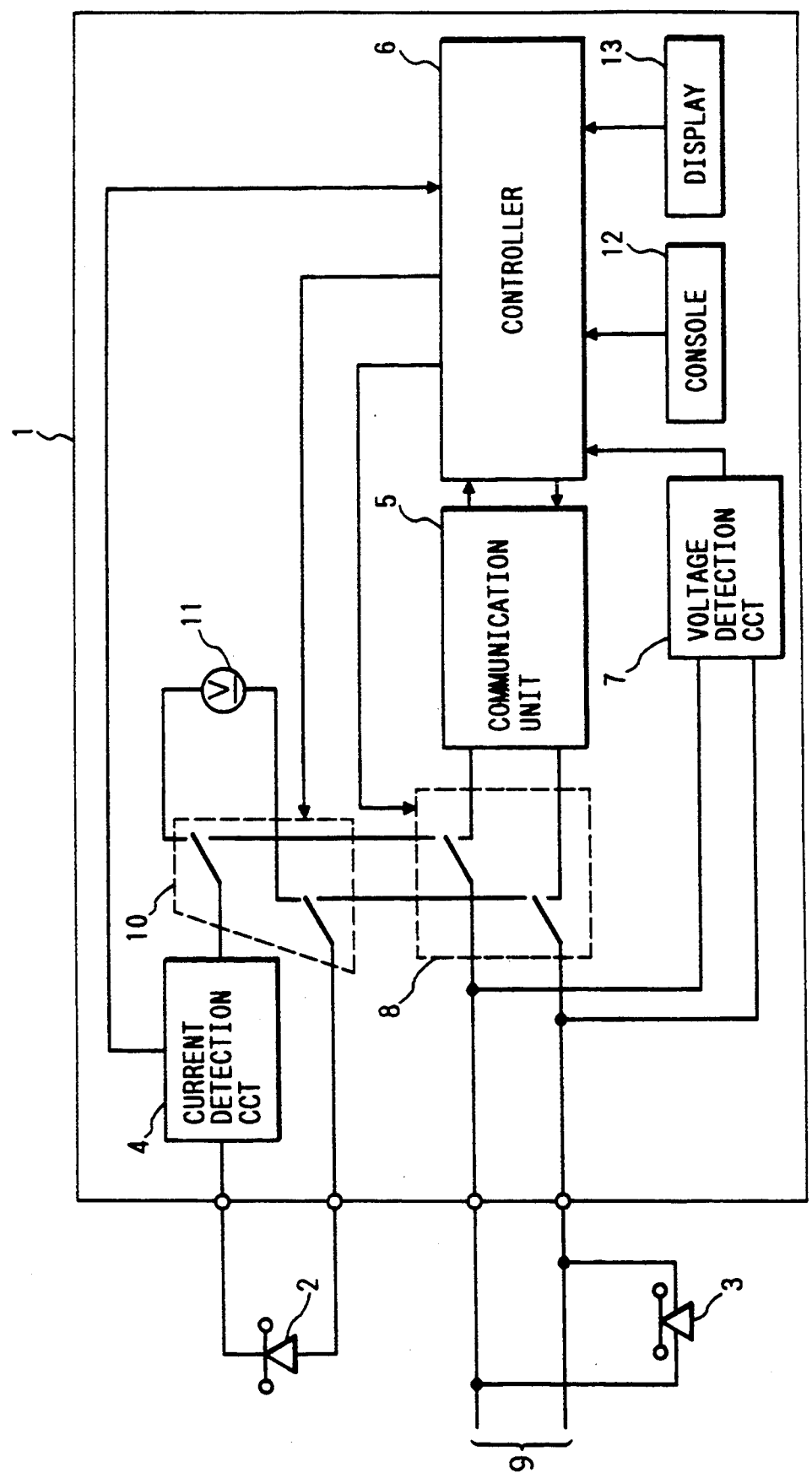
FIG. 1 shows a block diagram of a configuration of an embodiment of a communication apparatus.

FIG. 1 shows a block diagram of a configuration of the communication apparatus in accordance with the present embodiment.

In FIG. 1, numeral 1 denotes a communication apparatus, numeral 2 denotes a telephone set connected through the communication apparatus 1, numeral 3 denotes a telephone set which is directly connected to a telephone line 9 to which the communication apparatus 1 is connected, numeral 4 denotes a current detection circuit located between the telephone line 9 and the telephone set 2 in the communication apparatus 1 for detecting a current which flows when the telephone set 2 is off-hooked, numeral 5 denotes a communication unit including a modem, signal generators and DTMF (dual tone multi-frequency) detection circuit required for the communication, numeral 6 denotes a control unit for controlling the overall communication apparatus 1, numeral 7 denotes a voltage detection unit for detecting a line voltage of the telephone line 9, numeral 8 denotes a CML relay which switches the connection of the telephone line 9 to the telephone set 2 or the communication unit 5, numeral 9 denotes the telephone line to which the communication apparatus 1 is connected and which is an external line or an extension line of a PBX, numeral 10 denotes an H relay which switches the connection of the current detection circuit 4 and the telephone set 2 to the telephone line 9 or a DC power supply 11, numeral 11 denotes the DC power supply for detecting a hook status of the telephone set 2 when the telephone set 2 is disconnected from the telephone line 9.

Figure 2:
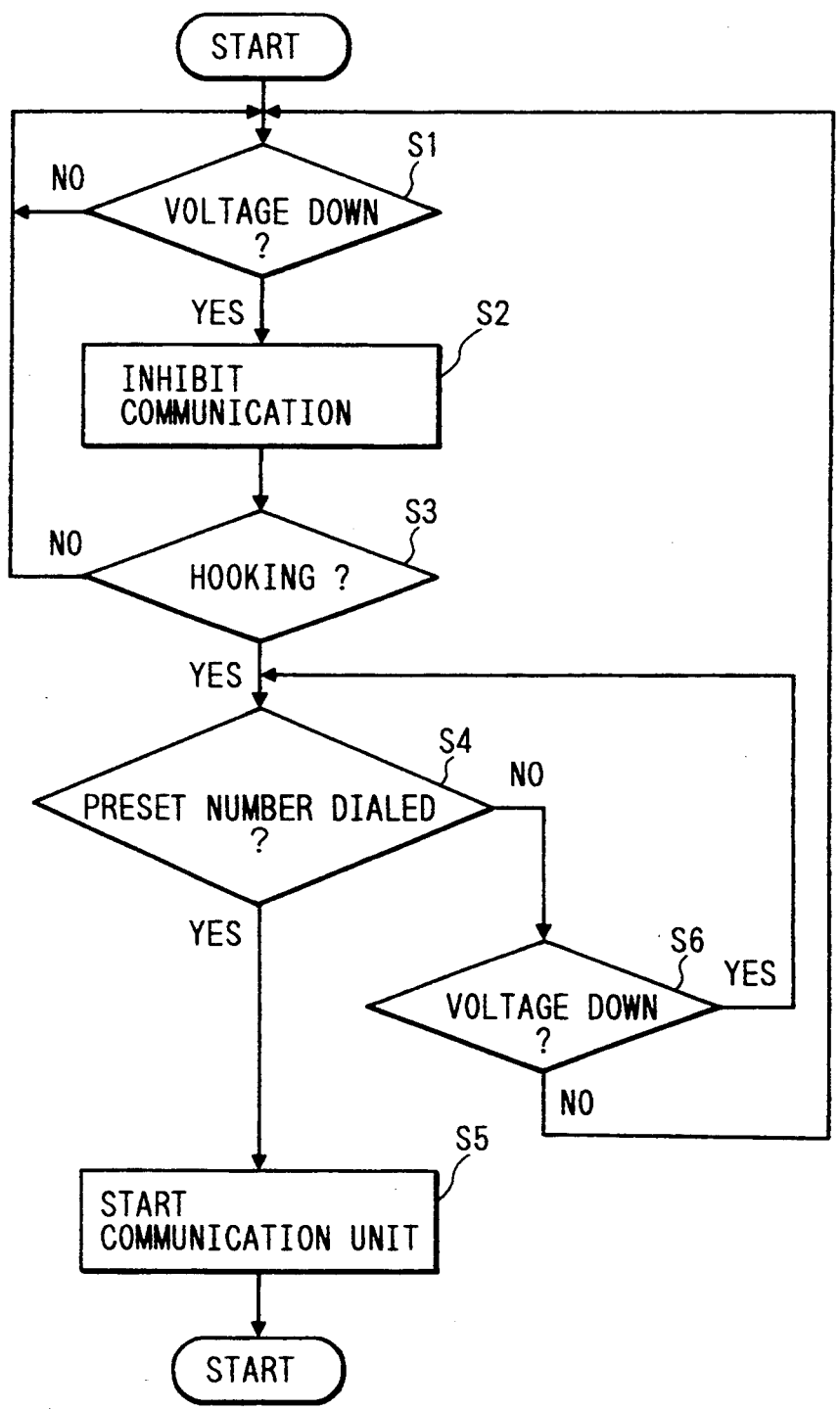
FIG. 2 shows a flow chart of a control operation in the embodiment.
Figure 3:
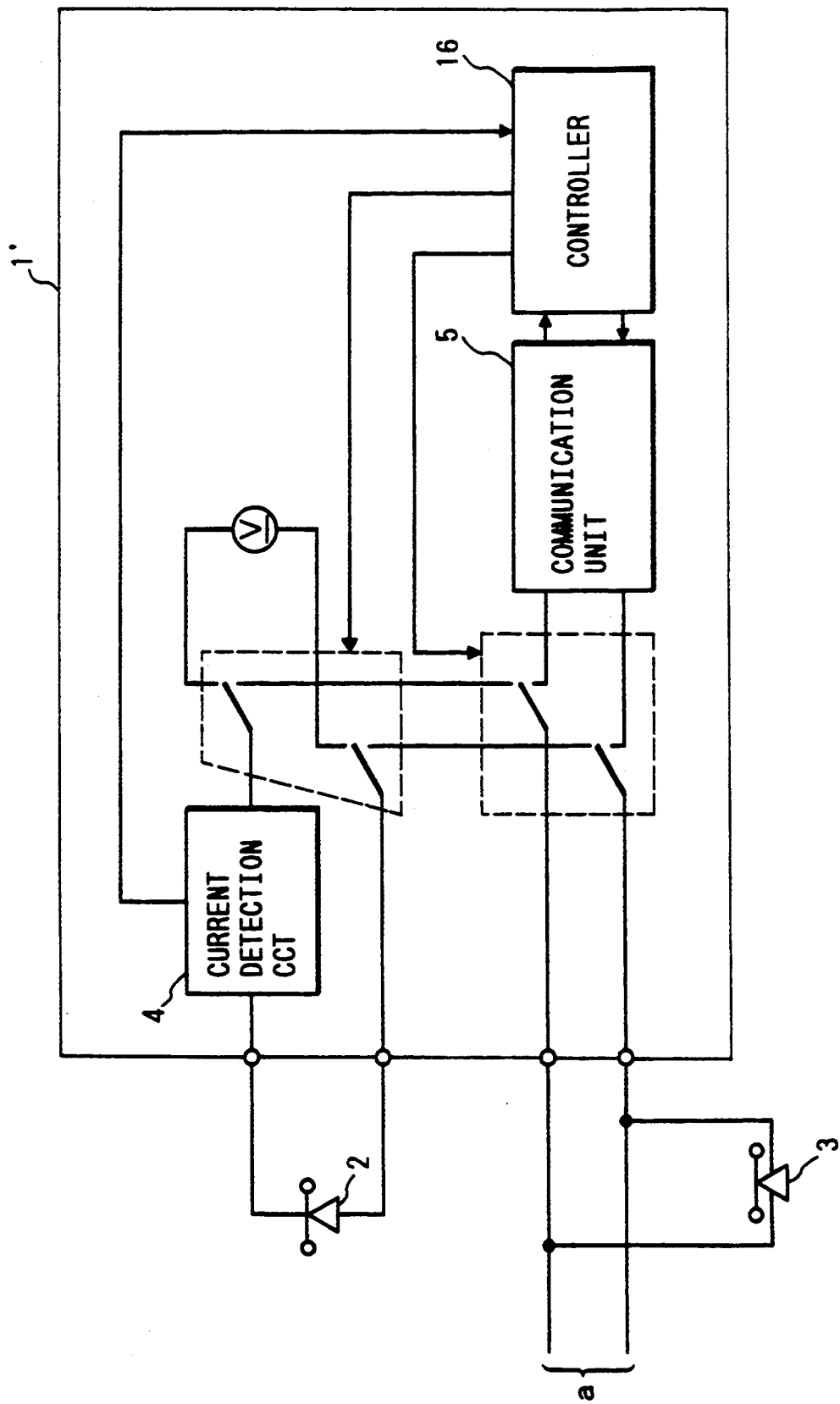
FIG. 3 shows a configuration of a prior art communication apparatus.

FIG. 2 shows a flow chart of an operation of the present embodiment.

In the above configuration, when the CML relay 8 is connected to the telephone set 2 and the H relay 10 is connected to the CML relay 8, a current flows into the current detection circuit 4 if the telephone set 2 is off-hooked. Accordingly, the control unit 6 can detect the off-hook of the telephone set 2.

On the other hand, when the telephone set 3 is off-hooked, no line current flows into the current detection circuit 4. However, the voltage detection circuit 7 detects the drop of the voltage of the telephone line 9 (step S1). The control unit 6 determines the off-hook of the telephone set 3 by the fact that the drop of the voltage of the telephone line 9 has been detected by the voltage detection circuit 7 in spite of no current flow in the current detection circuit 4. When the control unit 6 detects the off-hook of the telephone set 3, it switches the H relay 10 to the DC power supply 11.

Since the telephone set 2 is now disconnected from the telephone line 9, the communication of the telephone set 3 is not interfered with even if the telephone set 2 is inadvertently off-hooked. While the control unit 6 detects the off-hook of the telephone set 3, it does not switch the CML relay 8 to the communication unit 5 to bring itself into the communication status even if the start of communication is commanded by, for example, a manual operation of a console unit 12 (step S2). Accordingly, conflict with the telephone set 3 is avoided. In order to inform that the start of communication commanded by the console unit 12 is not permitted, the control unit 6 indicates the busy status of the telephone set 3 by a display 13.

When the telephone set 3 is off-hooked and in the busy status, the voltage detection circuit 7 can detect the voltage of the telephone line 9 without impeding the speech of the telephone set 3. If the telephone set 3 is a pulse dialing type telephone set, the control unit 6 may monitor the dialing operation of the telephone set 3 by the voltage detection circuit 7. Since the hooking is also effected by the switching of the line voltage as the pulse dialing operation is performed, the hooking may also be monitored without regard to the type of telephone set.

When the control unit 6 detects the hooking of the telephone set 3 once while the telephone set 3 captures the line (step S3), it monitors the dialing. Namely, when the telephone set 3 is of tone dialing type, the control unit 6 switches the CML relay 8 to the communication unit 5 which detects the DTMF signal from the telephone set 3. On the other hand, when the telephone set 3 is of pulse dialing type, the control unit 6 does not switch the CML relay 8 but detects the dial pulse generated by the telephone set 3, by the voltage detection circuit 7 (step S4). The control unit 6 previously stores whether the telephone set 3 is of pulse dialing type or of tone dialing type.

When the control unit 6 detects the preset number dialing of the telephone set 3, it controls the communication unit 5 to start the communication by the communication unit 5 (step S5). When the telephone set 3 is of pulse dialing type, the control unit 6 switches the CML relay 8 to the communication unit 5 prior to the start of communication by the communication unit 5. On the other hand, when the telephone set 3 is of tone dialing type, the communication is started as it is because the CML relay 8 has been switched to the communication unit 5 when the hooking of the telephone set 3 was detected.

If the telephone set 3 is on-hooked without preset number dialing (step S6), the control unit 6 returns the CML relay 8 and the H relay to the initial positions and terminates the detection of the preset number dialing.

The communication may be started by the detection of the off-hook of the telephone set 3 without waiting for the preset number dialing but the detection of the preset number dialing serves to prevent an error. It also permits the discrimination from the DTMF from the partner station.

When the control unit 6 detects another preset number dialing of the telephone set 3, it calls the daughter telephone set 2. When it detects a response by the daughter telephone set 2, it connects the telephone set 2 to the telephone line 9. In this manner, the transfer from the telephone set 3 to the telephone set 2 is permitted.

The telephone set 3 may have a facsimile function or a computer communication function. The same is true for the telephone set 2.

The communication unit 5 may conduct facsimile communication or computer communication, or it may be provided with a hand set for speech communication.

When the communication unit 5 is provided with a hand set and is used for speech communication, the control unit 6 does not connect the communication unit 5 to the telephone line 9 even if the communication unit 5 is off-hooked so long as the control unit 6 detects the off-hook of the telephone set 3. Thus, a privacy function is attained. When the control unit 6 detects the preset number dialing of the telephone set 3 which is busy, it rings a bell of the communication unit 5 to call an operator. Thus, the call of the operator of the communication apparatus 1 by the telephone set 3 is permitted.

When the type of the telephone set 3 is predetermined, the communication apparatus 1 may be designed to operate with one of the pulse dialing system or the tone dialing system.

Figure 4:
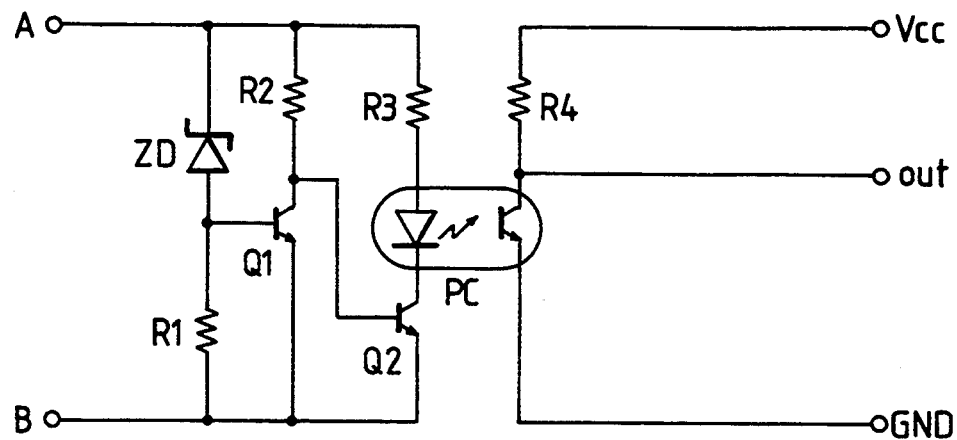
FIG. 4 shows a circuit diagram of a first configuration of a voltage detection circuit.
Figure 5:
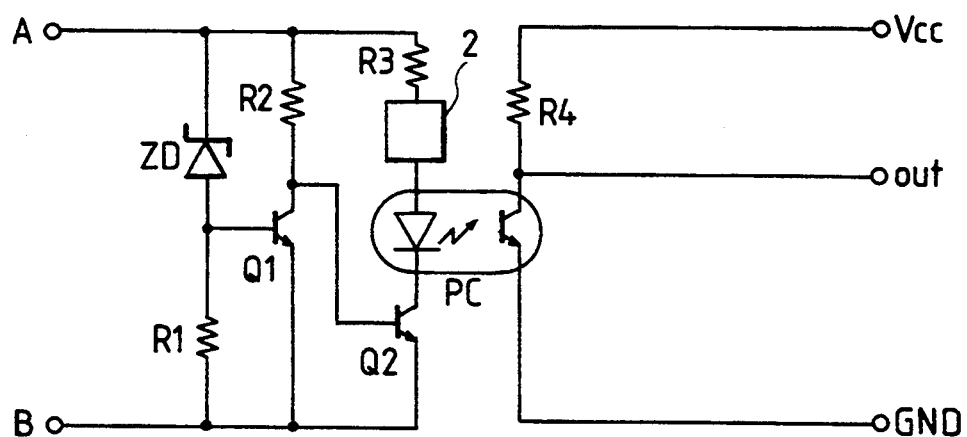
FIG. 5 shows a circuit diagram of a second configuration of the voltage detection circuit.

FIGS. 4 and 5 show configurations of the voltage detection circuit 7.

In FIG. 4, terminals A and B are connected to the telephone line. When a voltage between the terminals A and B is larger than a Zener voltage Vz (approximately 15 V) of a Zener diode, that is, when the parallel telephone set 3 is not used, a transistor Q1 is conductive and a transistor Q2 is nonconductive so that a photo-coupler PC is not activated and a terminal OUT is at a high level. When the voltage between the terminals A and B is lower than Vz, the transistor Q1 is nonconductive and the transistor Q2 is conductive so that a light emitting diode (LED) of the photo-coupler PC emits a light and the terminal OUT is at a low level.

In this manner, when the parallelly connected telephone set 3 captures the line and the line voltage drops, the LED of the photo-coupler PC emits the light so that the drop of the line voltage is detected by the level of the terminal OUT which is isolated from the line.

However, in the configuration of FIG. 4, if the resistor R3 is selected to secure a current necessary for the LED of the photo-coupler PC to emit the light even if the line voltage (the voltage between A and B) is low during the capture of the line, a higher current than required will flow through the LED of the photo-coupler PC when the line voltage is high. This not only causes the deterioration of the LED but also causes non-operation of the telephone set 3 depending on the type of the telephone set 3 because the current flowing through the parallelly connected telephone set 3 decreases.

Thus, the voltage detection circuit 7 is configured as shown in FIG. 5.

In FIG. 5, the terminals A and B are connected to the telephone line. When the voltage between A and B is larger than the Zener voltage Vz (approximately 15 V) of the Zener diode ZD, that is, when the telephone set 3 is not used, or when the telephone set 3 is sending the dialing pulse so that a DC loop is temporarily broken, the transistor Q1 is conductive and the transistor Q2 is nonconductive so that no current flows through the LED of the photo-coupler PC. Accordingly, substantially same potential (high level) as that of Vcc is produced at the terminal OUT. When the voltage between A and B is lower than Vz, the transistor Q1 is nonconductive and the transistor Q2 is conductive so that a current flows through the LED of the photo-coupler PC and the LED emits a light. The current flowing through the LED is kept constant by the constant current source 2 without regard to the voltage between A and B. A substantially same potential (low level) as GND level is produced at the terminal OUT. A resistor R3 is selected such that a sufficient current is supplied to the LED of the photo-coupler PC even if the voltage between A and B (line voltage) is low.

When the voltage detection circuit of FIG. 5 is used in the communication apparatus of FIG. 1, a communication system which is free from error due to misdetection is provided. Further, the deterioration of the light emitting element of the photo-coupler is prevented.

The present invention is not limited to the above embodiment but various modifications thereof may be made.

What is claimed is:

1. A communication apparatus which is connectable in parallel with a first communication equipment to a two-wire telephone line, and to which a second communication equipment is connectable, said apparatus comprising:

communication means for communicating through the two-wire telephone line;

switching means for selectively connecting the two-wire telephone line to said second communication equipment or said communication means;

voltage detection means for detecting a voltage across the two-wire telephone line;

current detection means arranged in a connection path between said switching means and said second communication equipment for detecting a current of the connection path;

command means for commanding communication by said communication means; and control means for controlling said switching means and the communication by said communication means in accordance with detecting by said voltage and current detection means and commanding by said command means.

2. A communication apparatus according to claim 1 wherein said communication means inhibits the start of communication in spite of the start command when a drop of voltage of the telephone line is detected.

3. A communication apparatus according to claim 1 further comprising means for receiving a control signal from the other equipment, wherein said control means monitors the reception of the control signal from the other equipment when a drop of voltage of the telephone line is detected.

4. A communication apparatus according to claim 1 wherein said voltage detection means includes a photocoupler which is turned on and off in accordance with a voltage level of the telephone line.

5. A communication apparatus according to claim 4 wherein a constant current source is connected in series to a light emitting element of said photocoupler.

6. A communication apparatus according to claim 1 wherein said voltage detection means comprises:

a first transistor conductive when the voltage level of the telephone line is higher than a predetermined level and nonconductive when the voltage level is lower than the predetermined level;

a second transistor rendered nonconductive by the conduction of said first transistor and rendered conductive by the nonconduction of said first transistor;

a photo-coupler for emitting a light in accordance with the conduction and the nonconduction of said second transistor; and a constant current circuit for supplying a constant current to a light emitting element of said photo-coupler.

7. An apparatus according to claim 1, wherein said communication means communicates a facsimile signal.

8. An apparatus according to claim 1, wherein said control means discriminates which of said first and second communication equipment is operated, on the basis of the detecting by said voltage and current detection means and controls said switching means in accordance with a discrimination result.

9. An apparatus according to claim 1, further comprising monitor means for monitoring a remote control signal from said first communication equipment to control said communication means after a voltage drop is detected by said voltage detection means, wherein said control means controls the communication by said communication means in accordance with the remote control signal.

10. A communication apparatus connectable in parallel with other communication equipment to a two-wire telephone line, comprising:

communication means for communicating through the two-wire telephone line;

voltage detection means for detecting a voltage across the two-wire telephone line;

monitor means for monitoring a remote control signal from the other communication equipment to control said communication means after a voltage drop is detected by said voltage detection means; and control means for controlling the communication by said communication means in accordance with the remote control signal.

11. A communication apparatus according to claim 10 wherein said control signal is used to start the communication by said communication means.

12. A communication apparatus according to claim 10 wherein said voltage detection means comprises:

a first transistor conductive when the voltage level of the telephone line is higher than a predetermined level and nonconductive when the voltage level is lower than the predetermined level;

a second transistor rendered nonconductive by the conduction of said first transistor and rendered conductive by the nonconduction of said first transistor;

a photo-coupler for emitting a light in accordance with the conduction and the nonconduction of said second transistor; and a constant current circuit for supplying a constant current to a light emitting element of said photo-coupler.

13. An apparatus according to claim 10, wherein said communication means communicates a facsimile signal.

* * * * *